(12) United States Patent
Lin et al.

(10) Patent No.: US 11,300,818 B2
(45) Date of Patent: Apr. 12, 2022

(54) FRAME ASSEMBLY FOR A SLIM DISPLAY DEVICE, AND APPLICATION OF THE FRAME ASSEMBLY TO A BACKLIGHT MODULE AND DISPLAY DEVICE

(71) Applicants: Radiant(Guangzhou) Opto-Electronics Co., Ltd, Guangzhou (CN); RADIANT OPTO-ELECTRONICS CORPORATION, Kaohsiung (TW)

(72) Inventors: Ming-Cheng Lin, Kaohsiung (TW); Yung-Chieh Chao, Kaohsiung (TW); Cheng-An Hsu, Kaohsiung (TW); Kuo-Hsuan Lu, Kaohsiung (TW)

(73) Assignees: RADIANT(GUANGZHOU) OPTO-ELECTRONICS CO., LTD, Guangzhou (CN); RADIANT OPTO-ELECTRONICS CORPORATION, Kaohsiung (TW)

( * ) Notice: Subject to any disclaimer, the term of this patent is extended or adjusted under 35 U.S.C. 154(b) by 0 days.

(21) Appl. No.: 16/718,313

(22) Filed: Dec. 18, 2019

(65) Prior Publication Data
US 2020/0150483 A1 May 14, 2020

Related U.S. Application Data

(63) Continuation of application No. PCT/CN2018/114695, filed on Nov. 9, 2018.

(51) Int. Cl.
*G02F 1/1333* (2006.01)
*G02F 1/13357* (2006.01)

(52) U.S. Cl.
CPC .. *G02F 1/133308* (2013.01); *G02F 1/133605* (2013.01); *G02F 1/133608* (2013.01); *G02F 1/133314* (2021.01); *G02F 1/133322* (2021.01)

(58) Field of Classification Search
CPC combination set(s) only.
See application file for complete search history.

(56) References Cited

U.S. PATENT DOCUMENTS

| 2013/0070407 A1 | 3/2013 | Wang et al. |
| 2015/0160401 A1 | 6/2015 | Namekata et al. |

(Continued)

FOREIGN PATENT DOCUMENTS

| CN | 101672991 A | 3/2010 |
| CN | 103148459 A | 6/2013 |

(Continued)

*Primary Examiner* — Lauren Nguyen
(74) *Attorney, Agent, or Firm* — Bacon & Thomas, PLLC

(57) ABSTRACT

A frame assembly is adapted to fix at least a film, an outer edge of the film is provided with at least a first assembly portion, and the frame assembly comprises a back plate, a frame unit, and at least a fixing unit. The frame unit includes an outer frame portion disposed outside an outer edge of the back plate, and a holding portion connected to the outer frame portion, wherein the holding portion has a bottom surface and a top surface opposite to the bottom surface. The fixing unit is combined with the bottom surface of the holding portion, and the fixing unit includes a second assembly portion that is not covered by the holding portion and combined with the first assembly portion of the film, so that the film is fixed in the frame assembly.

16 Claims, 10 Drawing Sheets

(56) References Cited

U.S. PATENT DOCUMENTS

| | | | |
|---|---|---|---|
| 2015/0355484 A1* | 12/2015 | Guo | G02B 6/0088 349/62 |
| 2016/0004007 A1* | 1/2016 | Chen | G02B 6/0088 349/65 |
| 2016/0085111 A1* | 3/2016 | Arita | G02F 1/133308 349/58 |
| 2017/0199416 A1 | 7/2017 | Liu et al. | |

FOREIGN PATENT DOCUMENTS

| | | | |
|---|---|---|---|
| CN | 103398352 A | 11/2013 | |
| CN | 104006332 A | 8/2014 | |
| CN | 205942201 A | 2/2017 | |
| CN | 206669375 U | 11/2017 | |
| CN | 108461050 A | 8/2018 | |
| TW | 201627728 A | 8/2016 | |
| WO | 2014012483 A1 | 1/2014 | |
| WO | 2014022483 A1 | 2/2014 | |

\* cited by examiner

FRAME ASSEMBLY FOR A SLIM DISPLAY DEVICE, AND APPLICATION OF THE FRAME ASSEMBLY TO A BACKLIGHT MODULE AND DISPLAY DEVICE

RELATED APPLICATIONS

This application is a continuation application of International Application No. PCT/CN2018/114695 filed on Nov. 9, 2018, which is incorporated herein by reference.

BACKGROUND OF THE INVENTION

1. Field of the Invention

The present invention relates to a frame assembly and its applications. More particularly, the present invention relates to a frame assembly for a slim display device, and its application to a backlight module and display device.

2. Description of the Prior Art

The frame of display device provides basic protection and prevents the light leakage at an edge of display panel. In the present commercial displays, the trend of frame design tends to get narrower so as to provide the consumers a better visual experience.

The display is provided with at least one film for diffusing light emitted by the light source, so that the display is capable of distributing light evenly. In the early days, the back plate of the display has a specific fixing lug to fix the film of the display or to position the film by the adhesive.

However, when the display becomes very slim, the back plate or the frame can no longer provide a space for a positioning structure to fix the film. If the fixing structure set on the slim back plate or the slim frame, its supporting strength would not be enough for positioning the film due to the miniaturization.

Therefore, it is desirable to provide a miniaturized film fixing structure for a display with narrow frame.

SUMMARY OF THE INVENTION

Therefore, an objective of an embodiment of the present invention is to provide a frame assembly adapted to fix at least a film. An outer edge of the film is provided with at least a first assembly portion. The frame assembly comprises a back plate, a frame unit, and at least a fixing unit.

The frame unit includes an outer frame portion disposed outside an outer edge of the back plate, and a holding portion connected to the outer frame portion, wherein the holding portion is provided with a bottom surface, and a top surface is opposite to the bottom surface.

The fixing unit is coupled to the bottom surface of the holding portion. The fixing unit includes a second assembly portion that is not covered by the holding portion and the second assembly is capable of coupling to the first assembly portion of the film.

Another technique of an embodiment of the present invention is that the frame unit further includes at least a first fastening portion disposed on the holding portion. The fixing unit further includes a main body connected to the second assembly portion, and at least a second fastening portion connected to the main body. The first fastening portion and the second fastening portion fit and combine together via a mechanical interference occurring between the first fastening portion and the second fastening portion.

Another technique of an embodiment of the present invention is that the main body has a first surface facing the holding portion, a second surface opposite to the first surface, and a third surface connected to the first surface and the second surface. The second fastening portion is disposed on the first surface of the main body.

Another technique of an embodiment of the present invention is that the second assembly portion is a protrusion which extending from the first surface of the main body, and the first assembly portion is a through hole disposed at the outer edge of the film.

Another technique of an embodiment of the present invention is that the main body is further provided with a first concave indented from the second surface toward the first surface, and two second concaves indented from the third surface toward the outer frame portion.

Another technique of an embodiment of the present invention is that the frame unit further includes an accommodated portion indented on the bottom surface of the holding portion and facing the back plate to form a space between the back plate and the frame unit. The accommodated portion is used to accommodate the fixing unit and provided with a fourth surface indented on the bottom surface, in which the fixing unit is capable of being pushed into the accommodated portion via the opening of the space formed between the back plate and the frame unit.

Another technique of an embodiment of the present invention is that the accommodated portion is further provided with a notch connected between the top surface and the fourth surface, so that the second assembly portion is located in the notch and not covered by the holding portion.

Another technique of an embodiment of the present invention is that the first fastening portion is a through hole penetrating the top surface and the fourth surface, and the second fastening portion is a protrusion protruding from the main body toward the top surface of the holding portion.

Another technique of an embodiment of the present invention is that the second fastening portion is provided with a first guiding side extending from the top edge of the second fastening portion to the outer frame portion and the first surface. The first guiding side presses against the fourth surface of the holding portion so that the main body of the fixing unit can be deformed by an external force when the fixing unit is pushed into the accommodated portion via the opening of the space formed between the back plate and the frame unit.

Another technique of an embodiment of the present invention is that the first fastening portion is a protrusion disposed on the fourth surface. The first fastening portion is provided with a second guiding side extending from the bottom surface of the first fastening portion in a direction opposite the outer frame portion and in a direction toward the top surface of the holding portion.

Another technique of an embodiment of the present invention is that the main body is provided with a horizontal plate connected to the second assembly portion, a side plate is extending from one side of the horizontal plate toward the back plate, and a bottom plate extending from the bottom edge of the side plate in a direction opposite the outer frame portion.

Another technique of an embodiment of the present invention is that the fixing unit further includes at least a block stop extending from the top edge of the side plate in a direction toward the holding portion and away from the outer frame portion. The frame unit further includes at least a groove disposed on the fourth surface, in which the block stop is fastened in the groove, and the block stop presses against the groove via a mechanical interference occurring between the groove and the block stop to keep a restore force, and the block stop releases the restore force when leaving the groove.

Another technique of an embodiment of the present invention is that the fixing unit is further provided with at least a block stop extending from a side of the side plate in a direction opposite the outer frame portion and outwardly away the second assembly portion. The accommodated portion is further provided with a fifth surface connected to the bottom surface and the fourth surface, and at least a groove disposed on the fifth surface. The block stop is fastened in the groove, and the block stop presses against the groove via a mechanical interference occurring between the groove and the block stop to keep a restore force, and the block stop releases the restore force when leaving the groove.

Another technique of an embodiment of the present invention is that the main body is provided with a horizontal plate connected to the second assembly portion, a side plate extending from one side of the horizontal plate toward the back plate, and a bottom plate extending from the bottom edge of the side plate in a direction opposite the outer frame portion, in which the second fastening portion is a through hole disposed on the horizontal plate.

Another objective of an embodiment of the present invention is to provide a backlight module comprising an aforementioned frame unit, a reflecting member, a light guide member, and at least a film.

The reflecting member is disposed above the back plate.

The light guide member is disposed above the reflecting member, in which the film is disposed above the light guide member.

Another objective of an embodiment of the present invention is to provide a display device comprising an aforementioned backlight module, a display panel disposed above the film, in which an outer edge of the display panel attached to the top surface of the holding portion.

The advantage of the embodiments in this present invention is that the accommodated portion is groove-like and locates on the bottom surface of the holding portion and faces the back plate, so that the fixing unit can be inserted into the accommodated portion. When the fixing unit is inserted into the accommodated portion, the first fastening portion is combined with the second fastening portion to fix the fixing unit to the holding portion of the frame unit, as well as the second assembly portion of the fixing unit is used to combine with the first assembly portion of the film to fix the position of the film to the frame assembly.

DETAILED DESCRIPTION OF THE PREFERRED EMBODIMENTS

Figure 1:
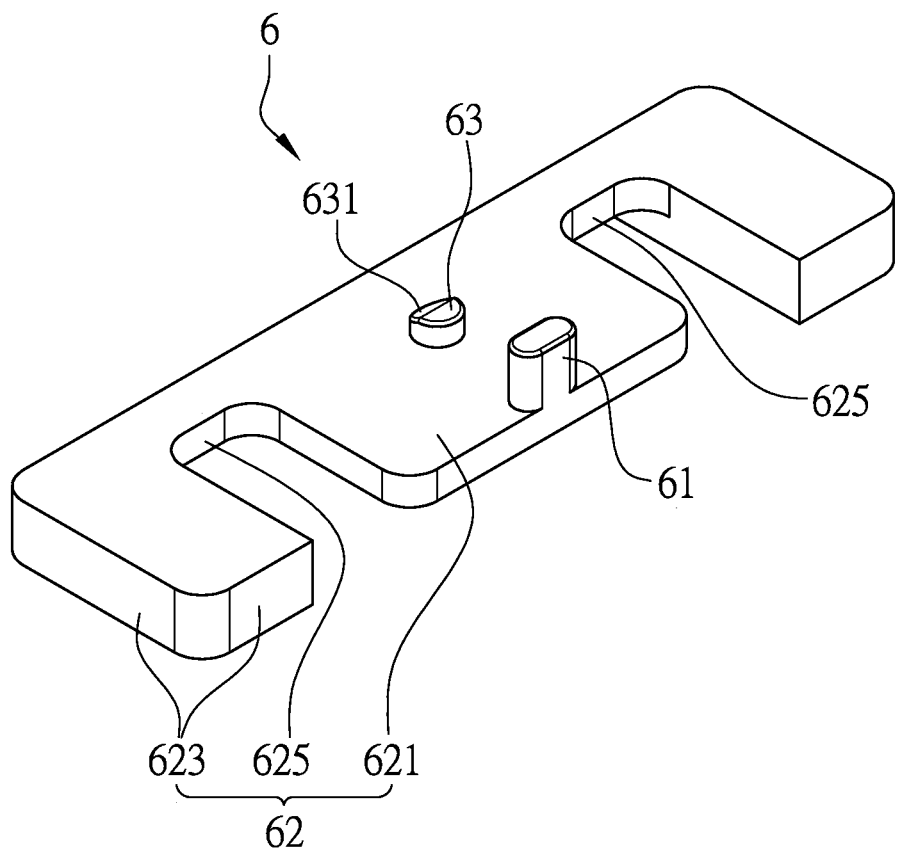
FIG. 1 is a schematic diagram illustrating a fixing unit in three dimensions according to a first preferred embodiment of the present invention.
Figure 2:
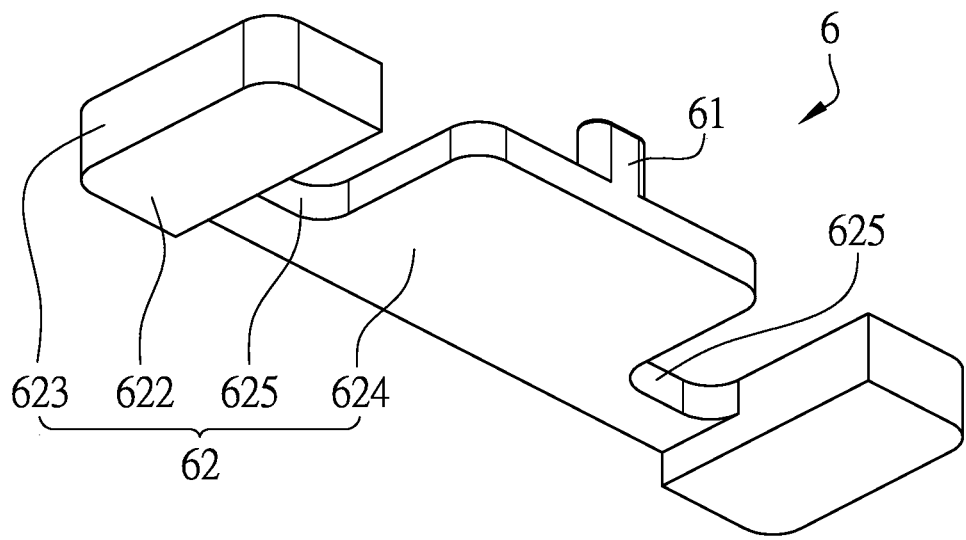
FIG. 2 is a schematic diagram illustrating the fixing unit in three dimensions from another angle according to the first preferred embodiment.
Figure 3:
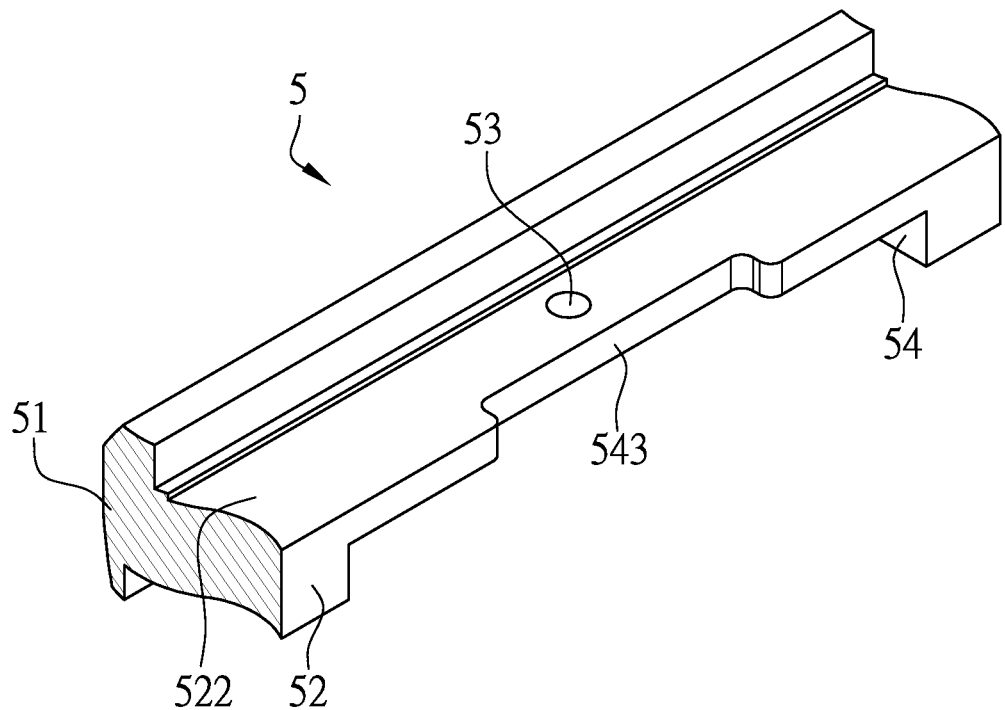
FIG. 3 is a schematic partial diagram illustrating a frame unit in three dimensions according to the first preferred embodiment.
Figure 4:
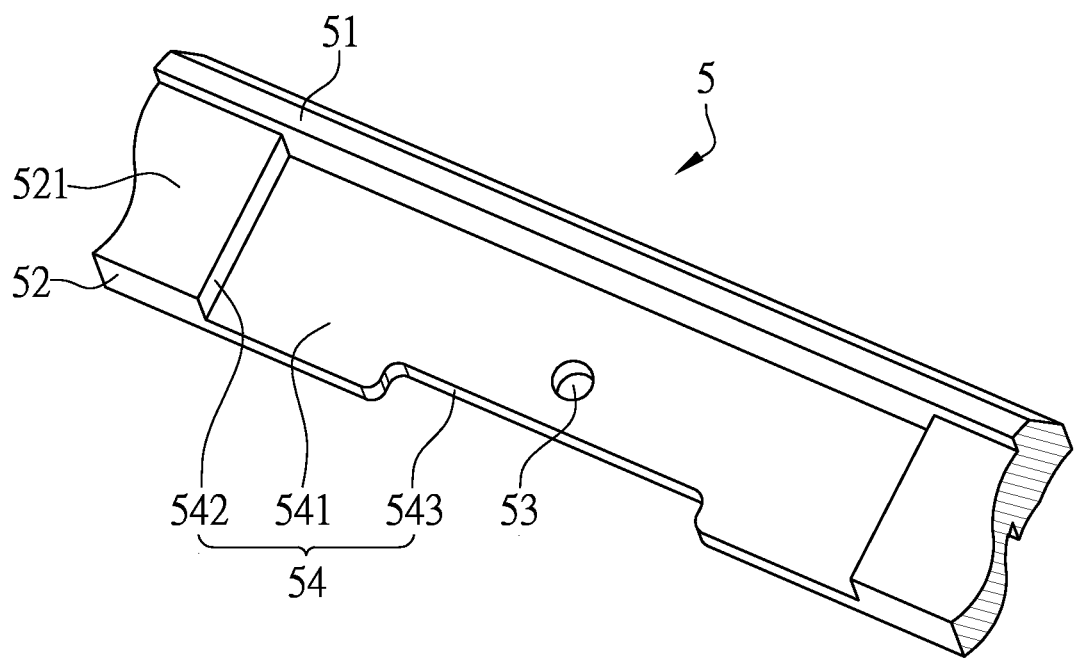
FIG. 4 is a schematic partial diagram illustrating the frame unit in three dimensions from another angle according to the first preferred embodiment.

Specific structural and functional details disclosed herein will become apparent from the following description of the three preferred embodiments of the present invention taken in conjunction with the accompanying drawings, which provides better understanding to a person having ordinary skill in the art but shall not be construed as limiting the invention. Wherever possible, the same reference numbers are used in the drawings and the description to refer to the same or like parts.

A first preferred embodiment of a frame assembly is provided. The frame assembly is adapted to fix at least one film 4. An outer edge of the film 4 is provided with at least one first assembly portion 41. The frame assembly comprises a back plate 3, a frame unit 5 and at least one fixing unit 6. The back plate 3 is generally in a square shape.

Please refer to FIGS. 1, 2, 3, and 4, the frame unit 5 includes an outer frame portion 51 disposed outside an outer edge of the back plate 3, a holding portion 52 connected to the outer frame portion 51, a first fastening portion 53 disposed on the holding portion 52, and a accommodated portion 54 indented on the holding portion 52. The holding portion 52 is provided with a bottom surface 521 and a top surface 522 opposite to the bottom surface 521.

The accommodated portion 54 is indented on the bottom surface 521 of the holding portion 52. The accommodated portion 54 is provided with a fourth surface 541 indented on the bottom surface 521, a fifth surface 542 connected between the bottom surface 521 and the fourth surface 541, and a notch 543 connected between the top surface 522 and the fourth surface 541. The first fastening portion 53 is a through hole penetrating the top surface 522 and the fourth surface 541.

The fixing unit 6 includes a second assembly portion 61, a main body 62 connected to the second assembly portion 61, and a second fastening portion 63 connected to the main body 62.

The main body 62 is provided with a first surface 621, a second surface 622 opposite to the first surface 621, a third surface 623 connected to the first surface 621 and the second surface 622, a first concave 624 indented from the second surface 622 toward the first surface 621, and two second concaves 625 indented from the third surface 623 toward the outer frame portion 51.

In the first preferred embodiment, the second fastening portion 63 is a protrusion which extends upward from the first surface 621 of the main body 62. A top edge of the second fastening portion 63 is provided with a first guiding side 631, and the second assembly portion 61 is a protrusion from the first surface 621 of the main body 62.

In the first preferred embodiment, the fixing unit 6 is formed by injection molding, and is made from flexible plastic material, so that the flexible second fastening portion 63 can be inserted into the first fastening portion 53 for position. In addition, the main body 62 is enable to be deformed easily due to the deposition of the first concave 624 and the second concaves 625. When the fixing unit 6 is in the process of inserting into the accommodated portion 54, the fixing unit 6 will be pressed and deformed by the frame unit 5 to keep a force. When the fixing unit 6 is fully inserted into the accommodated portion 54 and the second fastening portion 63 is engaged with the first fastening portion 53, the force which the fixing unit 6 keeps will be released, so as to ensure that the fixing unit 6 and the frame unit 5 can hold the film 4 more stably.

Figure 5:
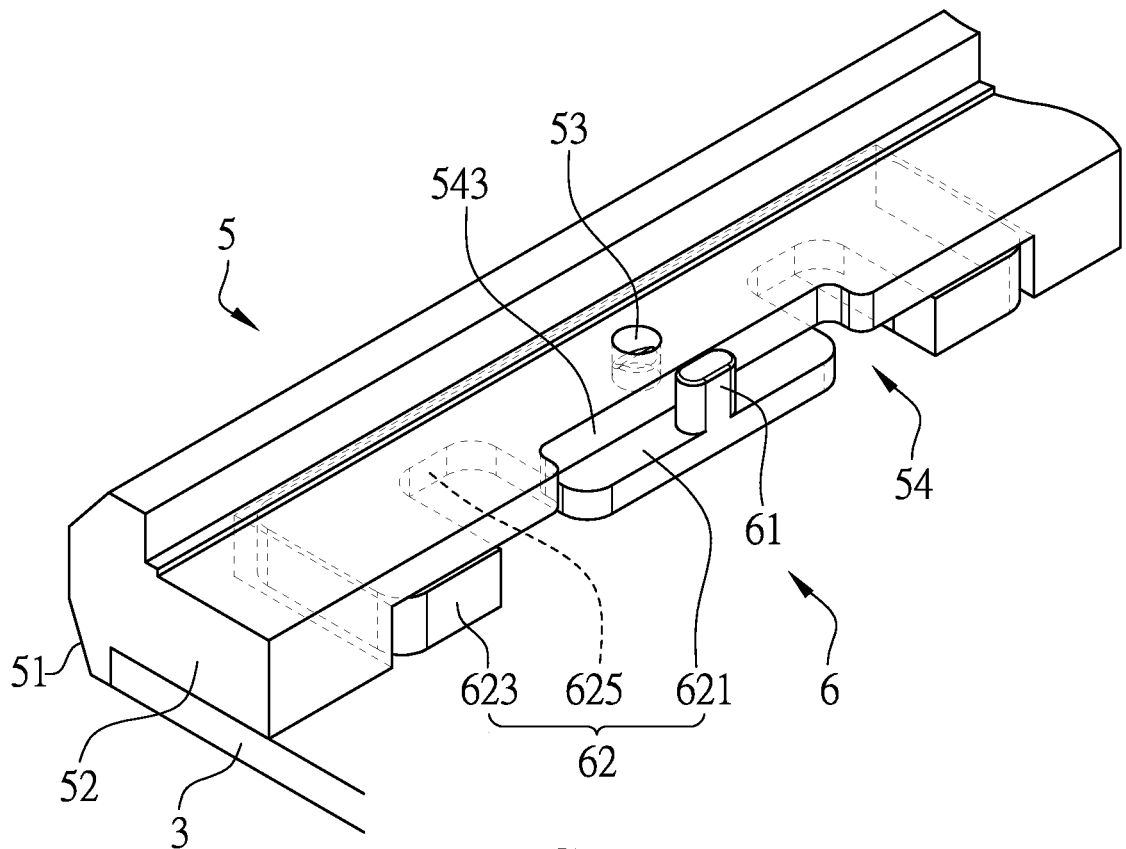
FIG. 5 is a schematic diagram illustrating the combination of the fixing unit and the frame unit according to the first preferred embodiment.

Please refer to FIG. 5, the back plate 3 is connected to the bottom surface 521 of the holding portion 52 of the frame unit 5, and the outer frame portion 51 is located at the outer edge of the back plate 3. The accommodated portion 54 is groove-like and locates on the bottom surface 521 of the holding portion 52 and faces the back plate 3, so that the fixing unit 6 can be pushed into the accommodated portion 54 via the opening of the groove 55. The accommodated portion 54 can be engaged with the fixing unit 6, so that the fixing unit 6 is coupled to the bottom surface 521 of the holding portion 52. The first guiding side 631 disposed on the top edge of the second fastening portion 63 can continuously press against the fourth surface 541 of the holding portion 52 when the fixing unit 6 is pushed in, so that the main body 62 of the fixing unit 6 will be deformed by an external force to help push the fixing unit 6 into the accommodated portion 54.

When the fixing unit 6 is disposed on the accommodated portion 54, the first concave 624 is indented toward the fourth surface 541 of the holding portion 52, and the two second concaves 625 are on the third surface 623 and are indented toward the outer frame portion 51. Due to the design of the notch 543, the second assembly portion 61 is located in the notch 543 and not covered by the holding portion 52, and the first surface 621 of the main body 62 faces the fourth surface 541 of the accommodated portion 54 of the holding portion 52.

Figure 6:
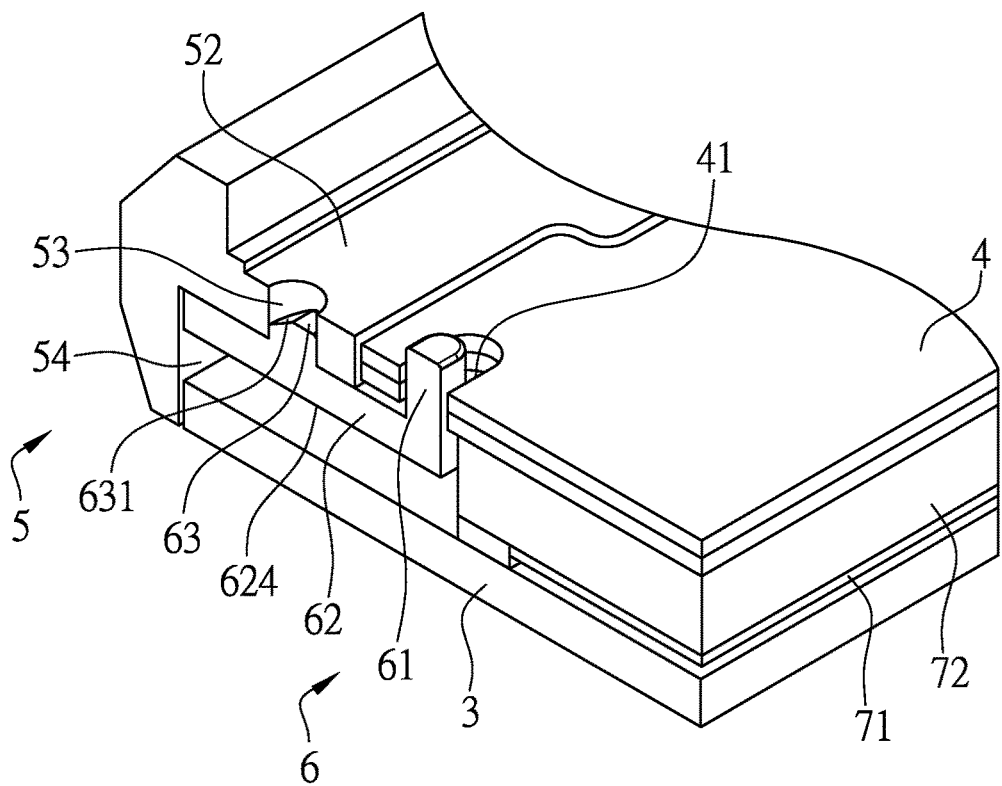
FIG. 6 is a sectional drawing illustrating a combination of a reflecting member and a light guide member according to the first preferred embodiment.

Please refer to FIG. 6, with the structure of the first concave 624, the thickness of the two sides of the main body 62 is greater than the thickness of the middle portion of the main body 62, and when the fixing unit 6 is fixed to the accommodated portion 54 of the frame unit 5, the first concave 624 of the main body 62 is spaced apart from the upper surface of the back plate 3. The first surface 621 of the main body 62 is connected to the fourth surface 541 of the accommodated portion 54, and the second fastening portion 63 is coupled to the first fastening portion 53, so that the fixing unit 6 is fixed in the accommodated portion 54 of the frame unit 5. The first guiding side 631 extends obliquely downward from the top edge of the second fastening portion 63 to the outer frame portion 51 and to the first surface 621 of the main body 62. The second fastening portion 63 is a protrusion which protruding from the first surface 621 of the main body 62 to the top surface 522 of the holding portion 52, and the first guiding side 631 helps push the fixing unit 6 into the accommodated portion 54 when installing the fixing unit 6.

After the fixing unit 6 is disposed in the accommodated portion 54, a reflecting member 71, a light guide member 72 and the film 4 are placed on the back plate 3. The first assembly portion 41 is a through hole disposed at the outer edge of the film 4. The second assembly portion 61 is not covered by the holding portion 52, so that the first assembly portion 41 of the film 4 can be coupled to the second assembly portion 61 of the fixing unit 6, and the film 4 is fixed in the frame unit 5. In the first embodiment, due to the design of the notch 543, the second assembly portion 61 is located in the notch 543 and not covered by the holding portion 52. In other embodiment, the design of the notch 543 can be cancelled, the main body 62 is designed to extend further and beyond the holding portion 52, therefore the second assembly portion 61 is also not covered by the holding portion 52. Hence, the design of the notch 543 shall not be construed as limiting the invention.

Figure 7:
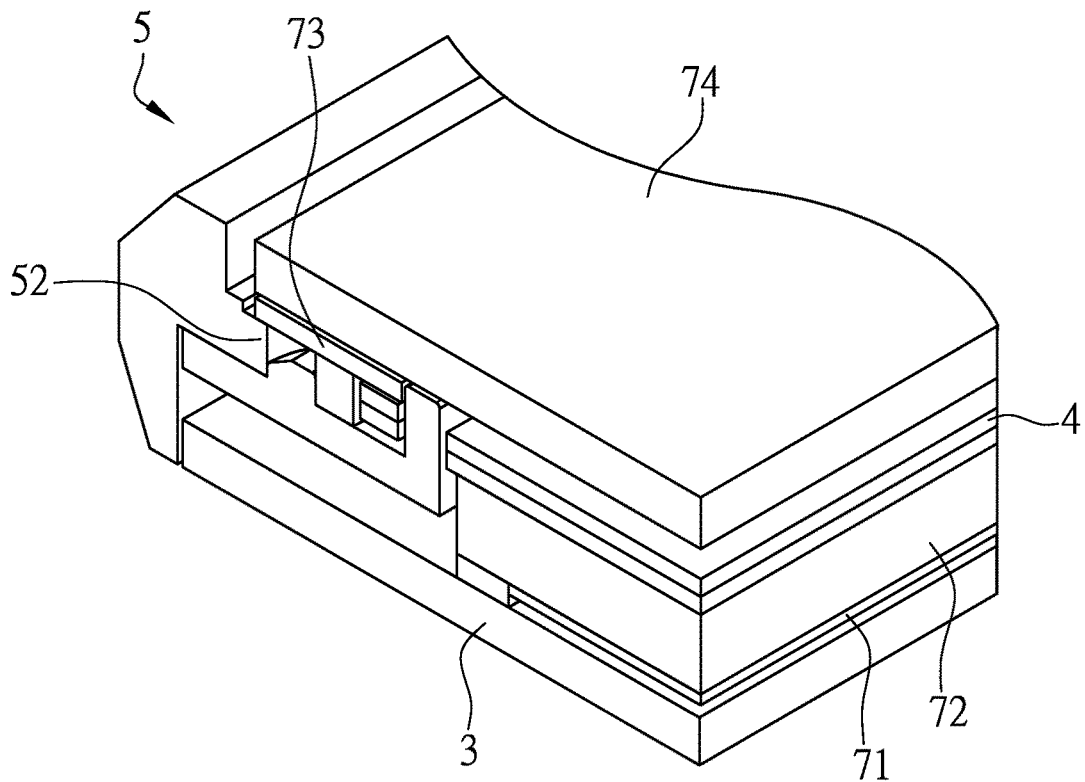
FIG. 7 is a sectional drawing illustrating a combination of a display panel according to the first preferred embodiment.

Please refer to FIG. 7, after the film 4 is fixed to the fixing unit 6, an adhesive 73 is adhered to the top surface 522 of the holding portion 52 of the frame unit 5, and a display panel 74 is attached to the adhesive 73. After light emitted from a light source of the display device is guided to the film 4 by the reflecting member 71 and the light guide member 72, the light can be evenly entered the display panel 74, and the back plate 3 can support the reflecting member 71, the light guide member 72, the film 4, and the display panel 74 above. The display panel 74 is a liquid crystal panel that uses liquid crystal to control the light emitted by the backlight module. Since the light control of the liquid crystal display device is a well-known technique, it is not the feature of the present invention and will not be described in detail herein.

Figure 8:
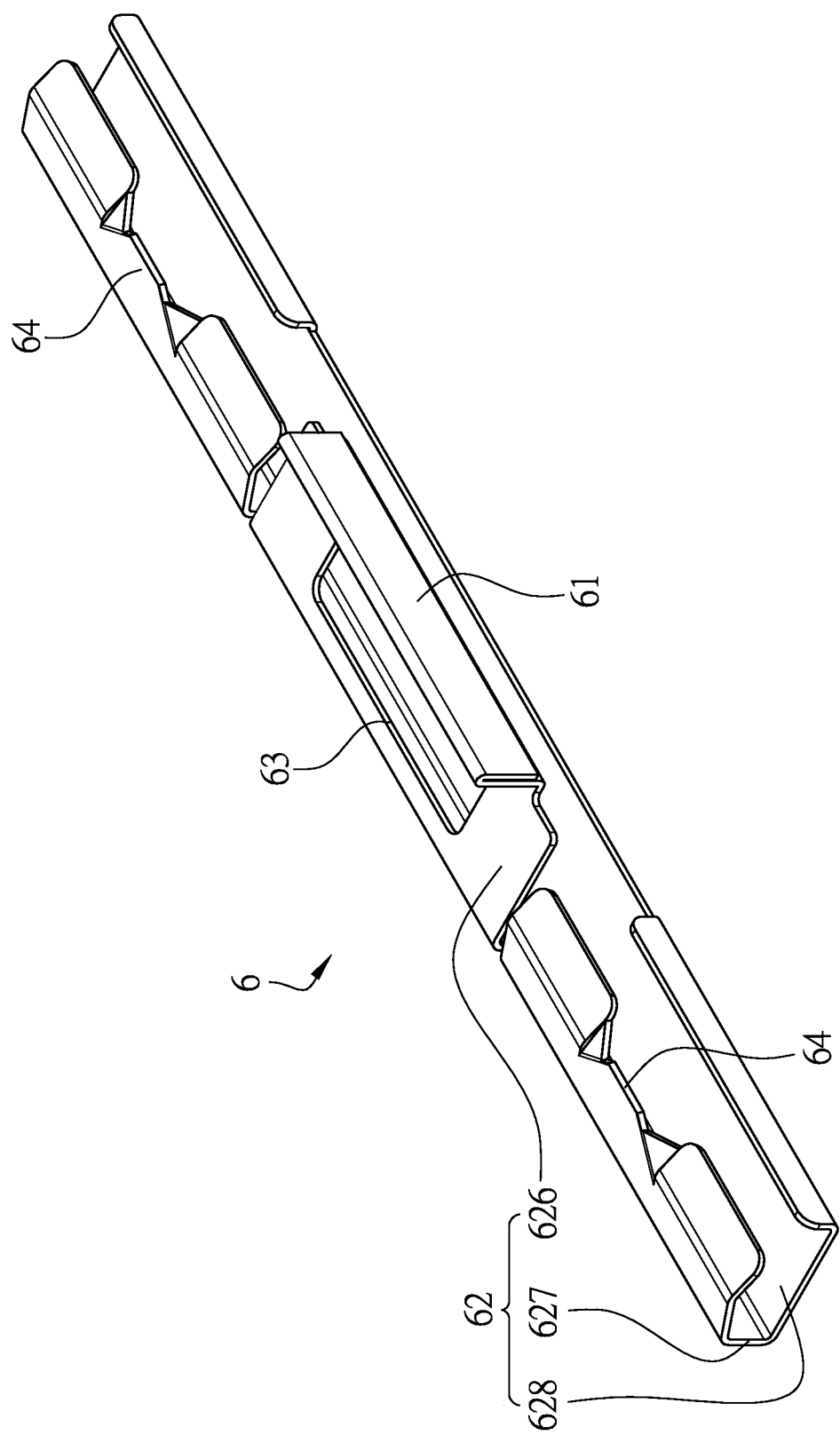
FIG. 8 is a schematic diagram illustrating a fixing unit in three dimensions according to a second preferred embodiment of the present invention.
Figure 9:
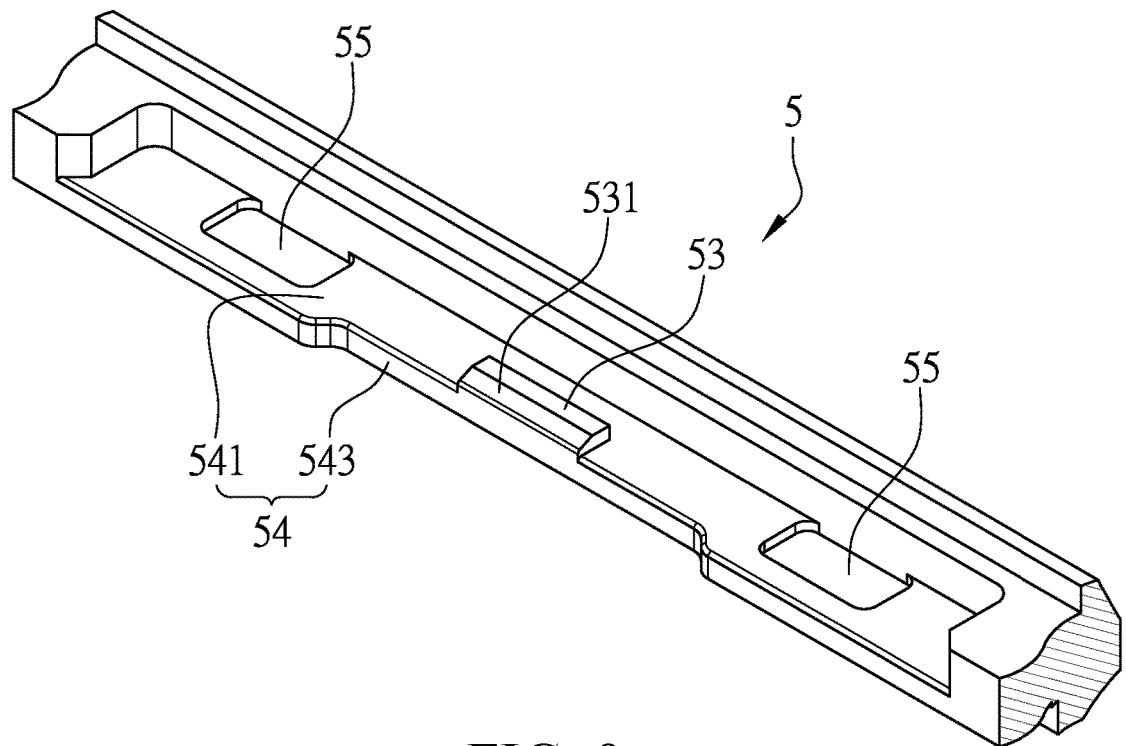
FIG. 9 is a schematic partial diagram illustrating a frame unit in three dimensions according to the second preferred embodiment.

Please refer to FIGS. 8 and 9, a second preferred embodiment of the frame assembly, which is similar to the first preferred embodiment, and the same is not described in detail herein. The difference is that the main body 62 of the fixing unit 6 is provided with a horizontal plate 626, a side plate 627 connected to the horizontal plate 626, and a bottom plate 628 connected to the side plate 627.

The second assembly portion 61 of the fixing unit 6 is disposed on the horizontal plate 626 and protrudes upward. The second fastening portion 63 of the fixing unit 6 is a through hole disposed on the horizontal plate 626. In the second preferred embodiment, the fixing unit 6 is a metal sheet, which is converted to different structures by metal stamping or metal punching. In actual implementation, the fixing unit 6 can be made by other materials and other methods, and shall not be construed as limiting the invention.

The first fastening portion 53 of the frame unit 5 is a protrusion disposed on the fourth surface 541. The bottom surface of the first fastening portion 53 is provided with a second guiding side 531. The second guiding side 531 extends obliquely downward toward the notch 543 of the accommodated portion 54, and the second guiding sides 531 facilitates the pushing of the fixing unit 6 into the accommodated portion 54 of the frame unit 5.

The fixing unit 6 further includes at least one block stop 64. In the second preferred embodiment, there are two block stops 64 which are respectively disposed on two sides of the main body 62. The two block stops 64 extend from the top edge of the side plate 627 toward the second assembly portion 61. The frame unit 5 further includes at least one groove 55 disposed on the fourth surface 541. In the second preferred embodiment, there are two grooves 55 are used to accommodate the two block stops 64 respectively.

Figure 10:
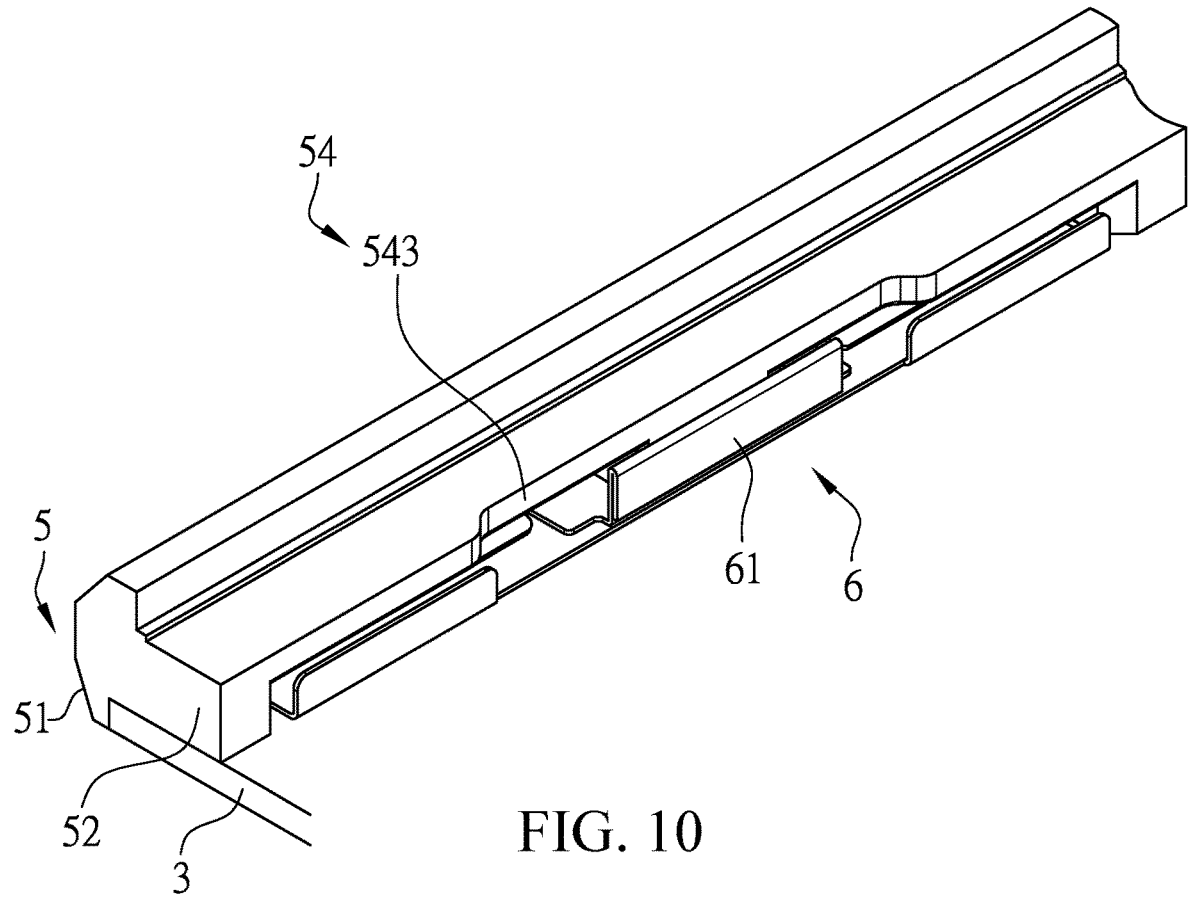
FIG. 10 is a schematic diagram illustrating the combination of the fixing unit and the frame unit according to the second preferred embodiment.

Please refer to FIG. 10, the back plate 3 is disposed on the bottom surface of the holding portion 52, and the outer frame portion 51 is located at the outer edge of the back plate 3. The accommodated portion 54 is groove-like and locates on the bottom surface 521 of the holding portion 52 and faces the back plate 3, so that the fixing unit 6 can be inserted into the accommodated portion 54 via the opening of the groove 55. When the fixing unit 6 is disposed in the accommodated portion 54, the second assembly portion 61 of the fixing unit 6 is located in the notch 543.

Figure 11:
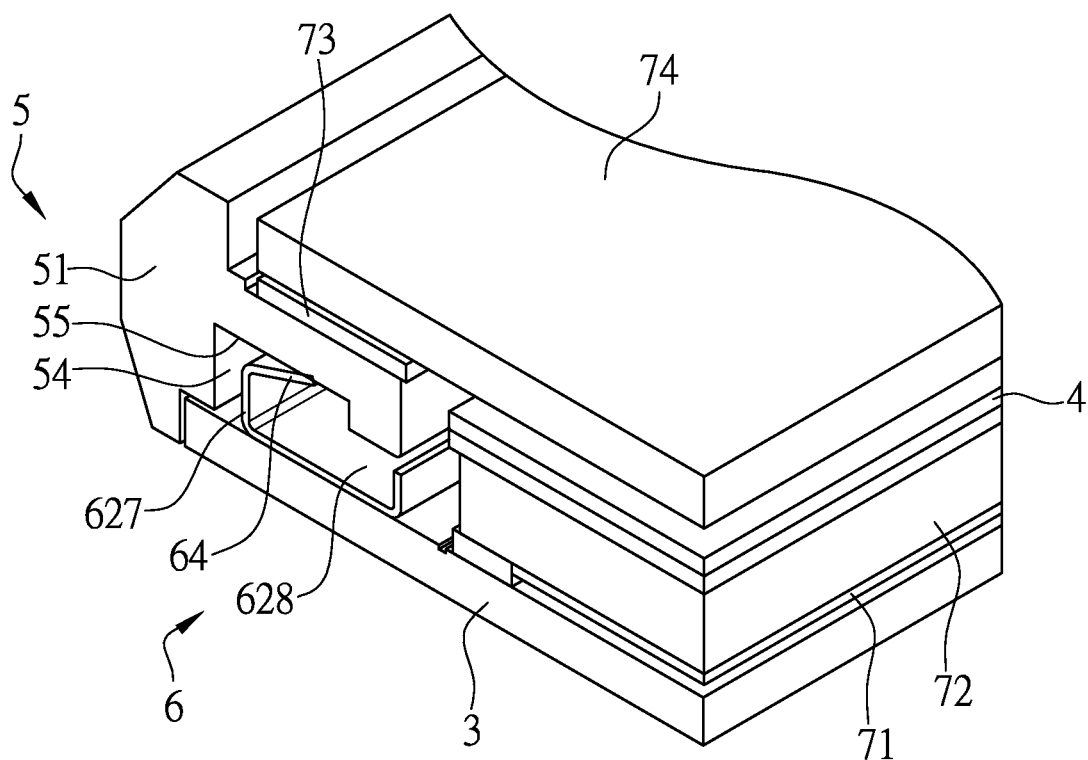
FIG. 11 is a sectional drawing according to the second preferred embodiment.
Figure 12:
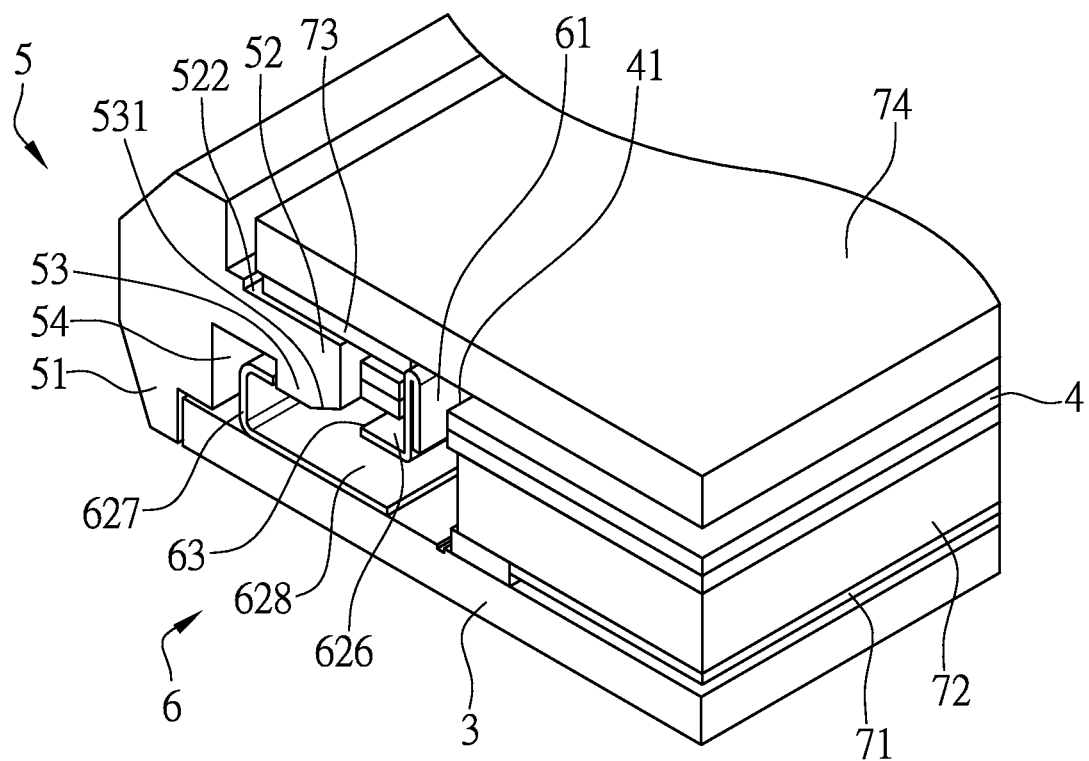
FIG. 12 is another sectional drawing according to the second preferred embodiment.
Figure 13:
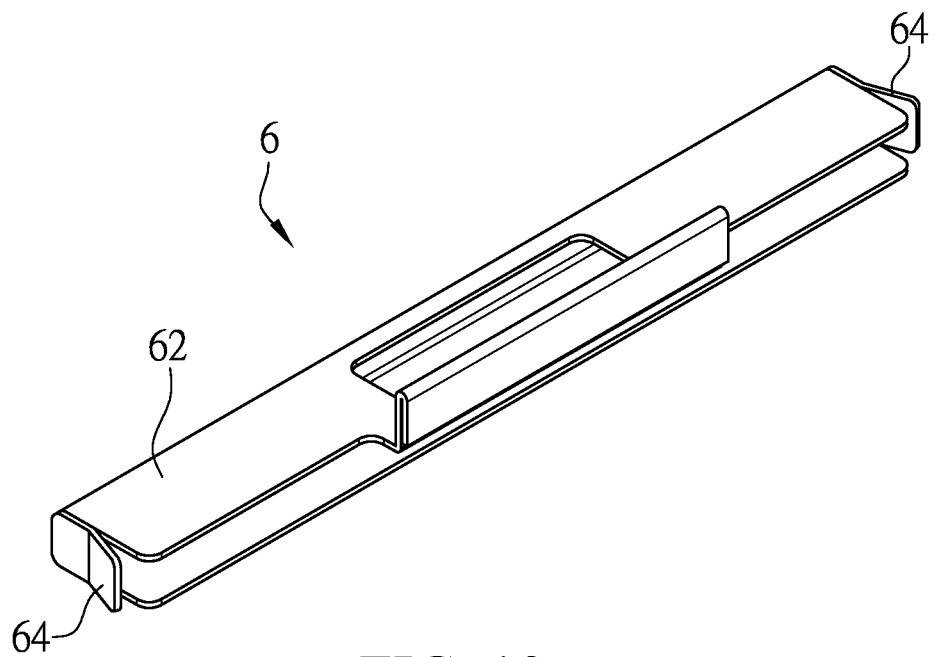
FIG. 13 is a schematic diagram illustrating a fixing unit in three dimensions according to a third preferred embodiment of the present invention.
Figure 14:
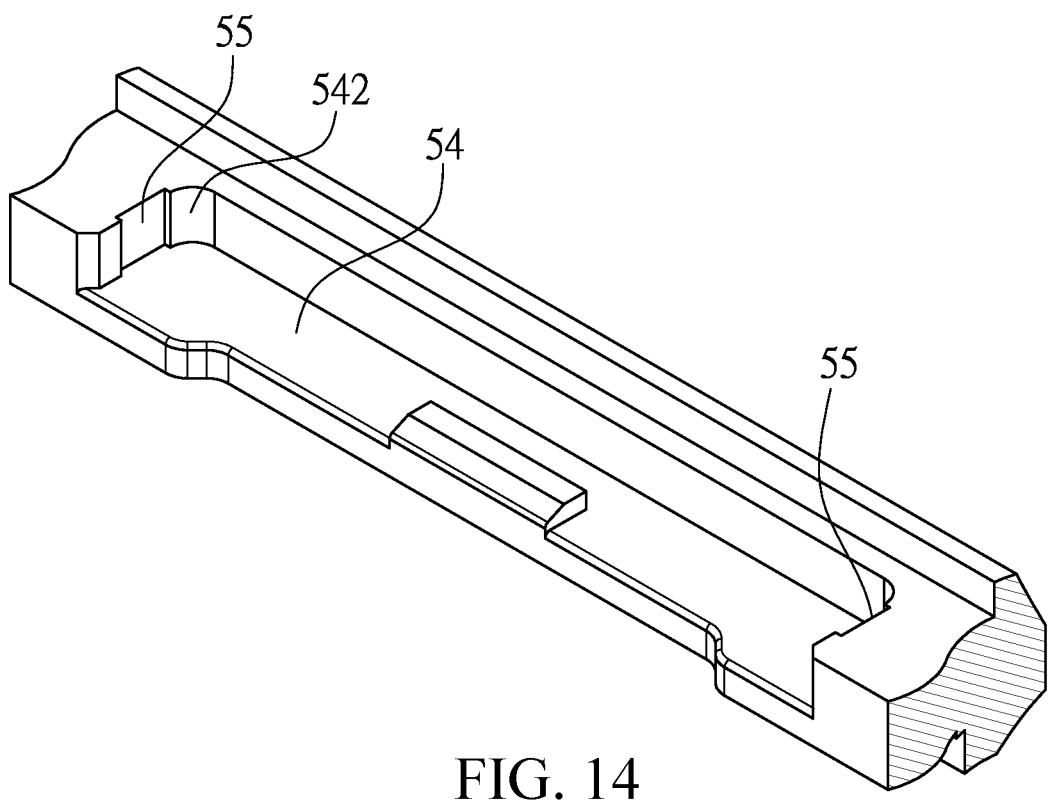
FIG. 14 is a schematic partial diagram illustrating a frame unit in three dimensions according to the third preferred embodiment.

Please refer to FIGS. 11 and 12, when the fixing unit 6 is disposed in the accommodated portion 54, the bottom plate 628 of the main body 62 is connected to the upper surface of the back plate 3. Since the fixing unit 6 is a metal sheet and the block stop 64 is flexible and bendable due to the curved shape, therefore the block stop 64 with flexibility of the fixing unit 6 is able to press against the groove 55 of the frame unit 5, and a mechanical interference between the groove 55 and the block stop 64 which is deformed to make a restoring force. Besides, the first fastening portion 53 of the frame unit 5 is engaged with the second fastening portion 63 of the fixing unit 6, and a mechanical interference occurs between the first fastening portion 53 and the second fastening portion 63. Due to the two mechanical interference mentioned above, the fixing unit 6 is able to fix in the accommodated portion 54 stably.

The second guiding side 531 extends from the bottom surface of the first fastening portion 53 toward the top surface 522 of the holding portion 52 and the extend direction is toward the opposite side of the outer portion 51. The side plate 627 extends from one side of the horizontal plate 626 toward the back plate 3, and the bottom plate 628 extends from the bottom edge of the side plate 627 in a direction opposite the outer frame portion 51.

Finally, the reflecting member 71, the light guide member 72 and the film 4 are disposed on the back plate 3. The first assembly portion 41 of the film 4 is coupled to the second assembly portion 61 of the fixing unit 6, and the position of the film 4 in the frame assembly can be fixed, and furthermore, the display panel 74 is attached to the top surface of the holding portion 52 by the adhesive 73.

Please refer to FIGS. 13, 14, 15, and 16, a third preferred embodiment of the frame assembly, which is similar to the second preferred embodiment, and the same is not described in detail herein. The difference is that the two block stops 64 of the fixing unit 6 extend obliquely outward from two sides of the side plate 627 in a direction opposite the main body 62. The two grooves 55 of the frame unit 5 are disposed on the fifth surface 542 of the accommodated portion 54 for respectively accommodating the two block stops 64.

Figure 15:
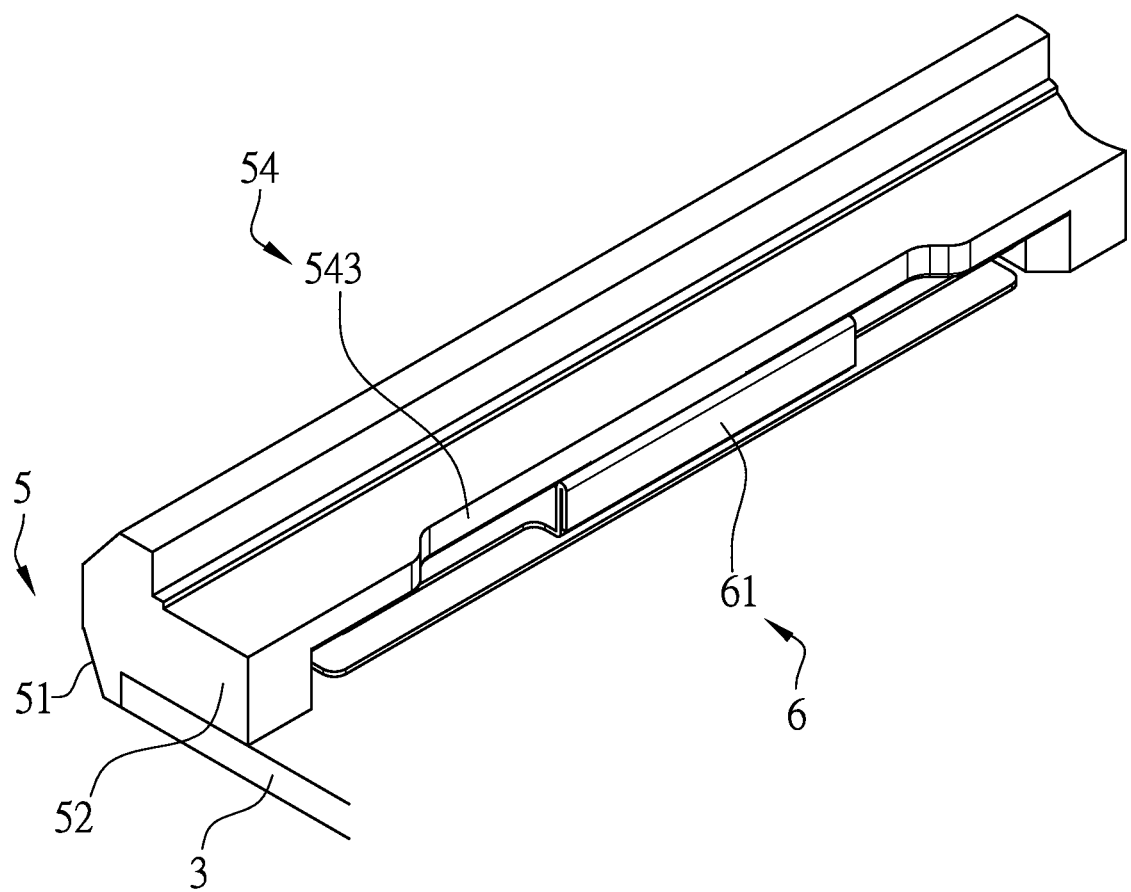
FIG. 15 is a schematic diagram illustrating the combination of the fixing unit and the frame unit according to the third preferred embodiment.

Please refer to FIG. 15, the back plate 3 is disposed on the bottom surface 521 of the holding portion 52. The accommodated portion 54 is groove-like and locates on the bottom surface 521 of the holding portion 52 and faces the back plate 3, so that the fixing unit 6 can be inserted into the accommodated portion 54 via the opening of the groove 55. When the fixing unit 6 is disposed on the accommodated portion 54, the second assembly portion 61 of the fixing unit 6 is located in the notch 543.

Figure 16:
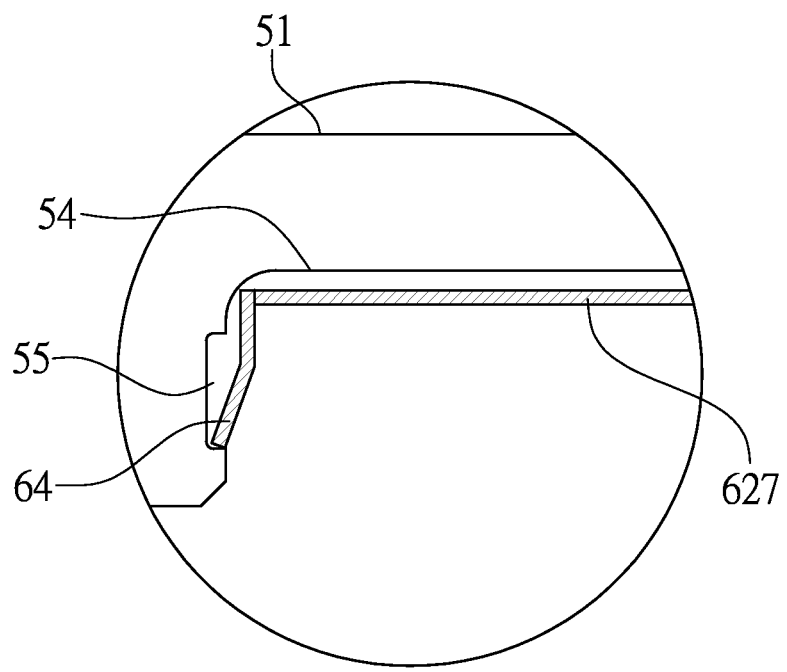
FIG. 16 is a schematic diagram illustrating the combination of a block stop and a groove according to the third embodiment.

Please refer to FIG. 16, when the fixing unit 6 is placed in the accommodated portion 54, the block stop 64 extends outward from a side of the side plate 627 in a direction opposite the outer frame portion 51 of the frame unit 5. The block stop 64 is fastened in the groove 55, and the fixing unit 6 is latched in the accommodated portion 54 of the frame unit 5 to ensure that the fixing unit 6 is securely coupled to the frame unit 5.

Figure 17:
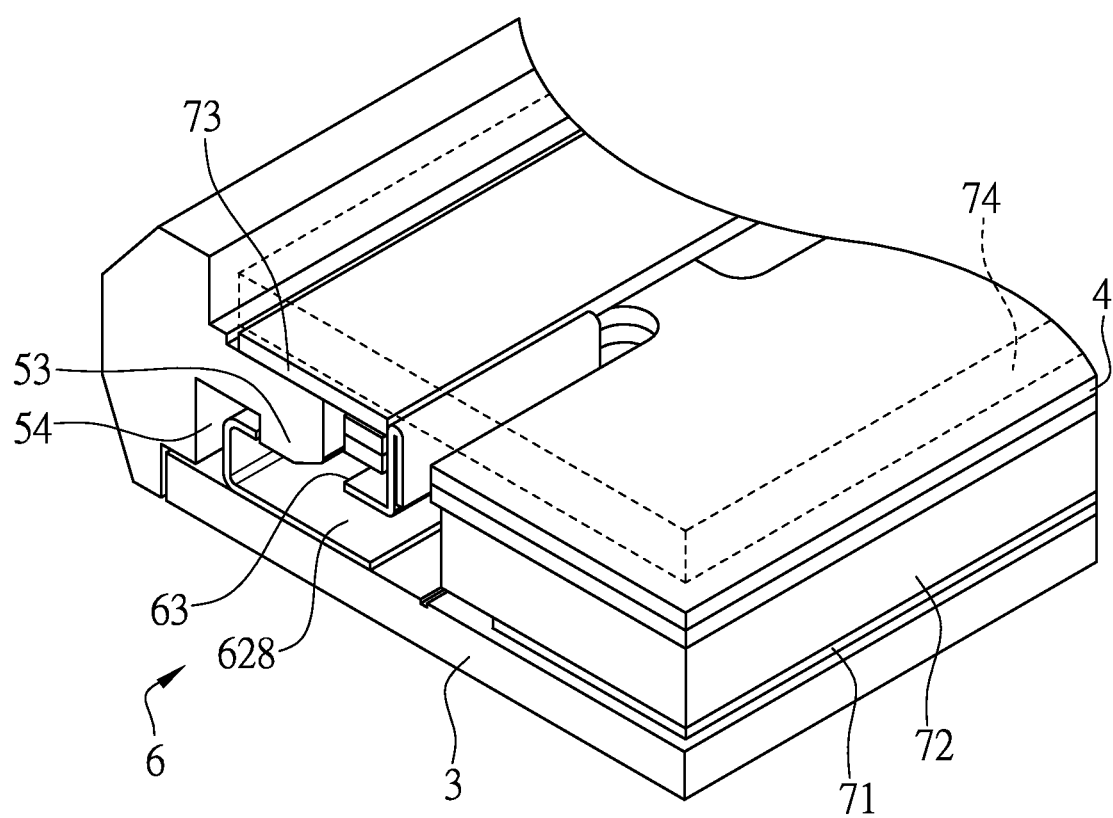
FIG. 17 is a sectional drawing according to the third preferred embodiment

Please refer to FIG. 17, when the fixing unit 6 is disposed on the accommodated portion 54, the bottom plate 628 of the main body 62 is located on the upper surface of the back plate 3. Since the fixing unit 6 is a metal sheet, and the block stop 64 is flexible and bendable due to the curve shape, therefore the two block stops 64 of the fixing unit 6 can press against the two grooves 55 of the frame unit 5, and a mechanical interference between the two grooves 55 and the two block stops 64 which is deformed to make a restoring force. Besides, the first fastening portion 53 is engaged with the second fastening portion 63, and a mechanical interference occurs between the first fastening portion 53 and the second fastening portion 63. Due to the two mechanical interference mentioned above, the fixing unit 6 is able to fix in the accommodated portion 54 stably.

Please refer to FIG. 6, a preferred embodiment of a backlight module is illustrated, wherein the frame assembly mentioned above is adapted to the backlight module. The backlight module includes a reflecting member 71, a light guide member 72, and at least one film 4. Although there are two films 4, in actual implementation, the number of the film 4 should be based on actual conditions, and shall not be construed as limiting the invention.

The reflecting member 71 is disposed above the back plate 3. The light guide member 72 is disposed above the reflecting member 71. The film 4 is disposed above the light guide member 72. An outer edge of the film 4 is provided with at least one first assembly portion 41, and the first assembly portion 41 can be coupled to the second assembly portion 61 of the fixing unit 6.

The holding portion 52 of the frame unit 5 surrounds the reflecting member 71, the light guide member 72, and the film 4. The edge of the film 4 is provided with at least one lug accommodated in the notch 543. The first assembly portion 41 is a through hole located on the lug and the second assembly portion 61 is a protrusion which extends upward from the first surface 621 of the main body 62, so that the first assembly portion 41 and the second assembly portion 61 can be fitted and combined together.

The light guide member 72 is used to conduct light from a light source (not shown in the drawings), and the reflecting member 71 reflects the light emitted from the light guide member 72, so that light can be emitted from the film 4 and emitted evenly.

Please refer to FIG. 7, a preferred embodiment of a display device is illustrated, which including the aforementioned backlight module and a display panel 74. The display panel 74 is disposed above the film 4, and an outer edge of the display panel 74 is attached to the top surface 522 of the holding portion 52 of the frame unit 5, so that the holding portion 52 is covered by the display panel 74, and the bezel-width of the display device can be narrowed or reduced due to the aforementioned frame assembly.

Preferably, the display panel 74 is adhered to the holding portion 52 by the adhesive 73. The reflecting member 71, the light guide member 72 and the film 4 of the backlight module is surrounded by the display panel 74, the frame unit 5 and the back plate 3. The fixing unit 6 fixed to the frame unit 5 can fix the position of the film 4.

The display panel 74 is a liquid crystal panel. The technique for light control by liquid crystals has been known in the related industry and is widely used in commercial products, which will not be described in detail herein.

With above description, the present invention of a frame assembly has following benefits:

1. Simple Structure

The accommodated portion disposed on the frame unit has a simple structure, and the back plate does not require additional processing. After the back plate is combined with the frame unit, the accommodated portion can provide the fixing unit for insertion, so that the film can accommodate to it.

2. Simple Procedure

The accommodated portion is groove-like and located on the bottom surface of the holding portion and faces the back plate, so that the fixing unit can easily be insert or push into the accommodated portion via the opening of the indentation and latched in the accommodated portion, and for combination of the fixing unit and the film.

3. Narrowed Frame

The top surface of the holding portion of the frame unit is adapted to attach the display panel, so that the bezel of the display device is exactly the frame portion of the frame unit, which leave an impression to the user that the bezel of the display device is narrowed.

In conclusion, due to the mechanical interfere between the first fastening portion of the frame unit and the second fastening portion of the fixing unit, the fixing unit can be disposed in the accommodated portion of the frame unit. The second assembly portion of the fixing unit provides a combination of the first assembly portion of the film, so that the position of the film on the frame assembly can be fixed. The outer edge of the display panel is attached to the top surface of the holding portion, so that the holding portion is covered by the display panel, and the display device can be presented with a narrower frame. Therefore, the aforementioned objective of the present invention can be achieved.

Although the present invention has been explained in relation to its three preferred embodiments, it is to be understood that many other possible modifications and variations can be made without departing from the scope of the invention as hereinafter claimed.

What is claimed is:

1. A frame assembly adapted to fix at least a film, an outer edge of the film provided with at least a first assembly portion, and the frame assembly comprising:
a back plate, including a center region, an outer edge and a top surface;
a frame unit, including an outer frame portion disposed outside the outer edge of the back plate, and a holding portion connected to the outer frame portion, wherein the holding portion is provided with a bottom surface, and a top surface is opposite to the bottom surface; and
at least a fixing unit, coupled to the bottom surface of the holding portion, wherein the fixing unit includes a second assembly portion that is not covered by the holding portion and the second assembly is capable of coupling to the first assembly portion of the film;
wherein the frame unit further includes an accommodated portion indented on the bottom surface of the holding portion and facing the back plate to form a space between the back plate and the frame unit,
wherein the accommodated portion is used to accommodate the fixing unit, and
wherein the fixing unit is capable of being pushed into the accommodated portion via the opening of the space formed between the back plate and the frame unit,
wherein the outer frame portion is disposed on the back plate along an upright direction, and the holding portion is extended from the outer frame portion inward along the top surface of the back plate from the outer edge of the back plate toward the center region of the back plate.

2. The frame assembly as claimed in claim 1, wherein the frame unit further includes at least a first fastening portion disposed on the holding portion, and
the fixing unit further includes a main body connected to the second assembly portion, and at least a second fastening portion connected to the main body, and
the first fastening portion and the second fastening portion fit and combine together via a mechanical interference occurring between the first fastening portion and the second fastening portion.

3. The frame assembly as claimed in claim 2, wherein the main body has a first surface facing the holding portion, a second surface opposite to the first surface, and a third surface connected to the first surface and the second surface, and
the second fastening portion is disposed on the first surface of the main body.

4. The frame assembly as claimed in claim 3, wherein the second assembly portion is a protrusion extending from the first surface of the main body, and
the first assembly portion is a through hole disposed at the outer edge of the film.

5. The frame assembly as claimed in claim 3, wherein the main body is further provided with a first concave indented from the second surface toward the first surface, and two second concaves indented from the third surface toward the outer frame portion.

6. The frame assembly as claimed in claim 3, wherein the accommodated portion is provided with a fourth surface indented on the bottom surface.

7. The frame assembly as claimed in claim 6, wherein the accommodated portion is further provided with a notch connected between the top surface and the fourth surface, so that the second assembly portion is located in the notch and not covered by the holding portion.

8. The frame assembly as claimed in claim 6, wherein the first fastening portion is a through hole penetrating the top surface and the fourth surface, and
the second fastening portion is a protrusion protruding from the main body toward the top surface of the holding portion.

9. The frame assembly as claimed in claim 8, wherein the second fastening portion is provided with a first guiding side extending from the top edge of the second fastening portion toward the outer frame portion and the first surface, and
the first guiding side presses against the fourth surface of the holding portion so that the main body of the fixing unit can be deformed by an external force when the fixing unit is pushed into the accommodated portion via the opening of the space formed between the back plate and the frame unit.

10. The frame assembly as claimed in claim 6, wherein
the first fastening portion is a protrusion disposed on the fourth surface, and
the first fastening portion is provided with a second guiding side extending from the bottom surface of the first fastening portion in a direction opposite the outer frame portion and in a direction toward the top surface of the holding portion.

11. The frame assembly as claimed in claim 6, wherein
the main body is provided with a horizontal plate connected to the second assembly portion, a side plate is extending from one side of the horizontal plate toward the back plate, and a bottom plate extending from the bottom edge of the side plate in a direction opposite the outer frame portion.

12. The frame assembly as claimed in claim 11, wherein
the fixing unit further includes at least a block stop extending from the top edge of the side plate in a direction toward the holding portion and away from the outer frame portion, and
the frame unit further includes at least a groove disposed on the fourth surface, wherein when the block stop is engaged to the groove, the block stop presses against the groove via a mechanical interference occurring between the groove and the block stop to keep a restore force which will be released when the block stop is disengaged from the groove.

13. The frame assembly as claimed in claim 11, wherein
the fixing unit is further provided with at least a block stop extending from a side of the side plate in a direction opposite the outer frame portion and outwardly away the second assembly portion,
the accommodated portion is further provided with a fifth surface connected between the bottom surface and the fourth surface, and
at least a groove is disposed on the fifth surface,
wherein the block stop is fastened in the groove, and the block stop presses against the groove via a mechanical interference occurring between the groove and the block stop to keep a restore force, and the block stop releases the restore force when leaving the groove.

14. The frame assembly as claimed in claim 2, wherein
the main body is provided with a horizontal plate connected to the second assembly portion, a side plate extending from one side of the horizontal plate toward the back plate, and a bottom plate extending from the bottom edge of the side plate in a direction opposite the outer frame portion, wherein the second fastening portion is a through hole disposed on the horizontal plate.

15. A backlight module comprising:
a frame unit as in claim 1;
a reflecting member disposed above the back plate;
a light guide member disposed above the reflecting member; and
wherein the film is disposed above the light guide member.

16. A display device comprising:
a backlight module according to claim 15; and
a display panel disposed above the film, wherein an outer edge of the display panel attached to the top surface of the holding portion.

* * * * *